July 31, 1962 P. E. APPLEBY 3,047,048
TIRE STITCHING APPARATUS
Filed Jan. 9, 1959

INVENTOR.
PAUL E. APPLEBY
BY
*R. L. Miller*
ATTORNEY

United States Patent Office 3,047,048
Patented July 31, 1962

3,047,048
TIRE STITCHING APPARATUS
Paul E. Appleby, Akron, Ohio, assignor to The Goodyear Tire & Rubber Company, Akron, Ohio, a corporation of Ohio
Filed Jan. 9, 1959, Ser. No. 785,821
9 Claims. (Cl. 156—410)

This invention relates to a pneumatic tire building apparatus and more particularly it relates to a stitching mechanism for such apparatus and the controls for such mechanism.

In building a tire on a revolving drum a plurality of plies of fabric are successively wound upon the drum and the beads are then applied over the plies at the edges of the drum. The overhanging edges of the plies are then turned up over the beads and rolled and stitched into place.

Prior mechanical stitchers have been employed to do some of the stitching of the ply stock about the tire beads but such prior stitchers have not made it possible for the tire builder to dispense with considerable hand stitching of the ply stock in working it about the beads. Some attempts have been made to provide mechanical stitchers with various controls to partially eliminate manual control of the positioning of the stitcher during the stitching operation but since tire building machines are commonly built to accommodate two or more sizes of building drums and since the orbit of the stitchers must be changed when the tire construction is changed the adjustment in the control for such stitchers requires considerable time and uncertainty to obtain an exact adjustment.

A principal object of the present invention is to provide a stitching mechanism for tire building machines having universal adjustment of positions relative to the surface of a tire upon which work is being done and during operation of the machine.

Another object of the present invention is to provide a stitching mechanism having a carriage which is actuated both axially and radially relative to the drum, the linear movement of the carriage in the axial and radial direction being universally variably controlled so as to produce a resultant controlled curvilinear pathway for the stitching mechanism.

Another object of the invention is to provide a stitching mechanism including an arm which may be pivoted to change the plane of rotation of the stitcher relative to the drum and an automatic control to vary the position of the plane of rotation of the stitcher.

Another object of the invention is to provide a stitching mechanism mounted on a pivotable arm which is supported on a carriage movable both radially and axially of the tire building drum and having universally variably controlling mechanisms for progressively changing the plane of rotation of the stitching mechanism and simultaneously controlling the axial and radial movement of the carriage to produce a resultant controlled curvilinear pathway of the carriage. For a better understanding of the invention reference should be made to the accompanying drawings wherein.

Figures 1, 2, 3:
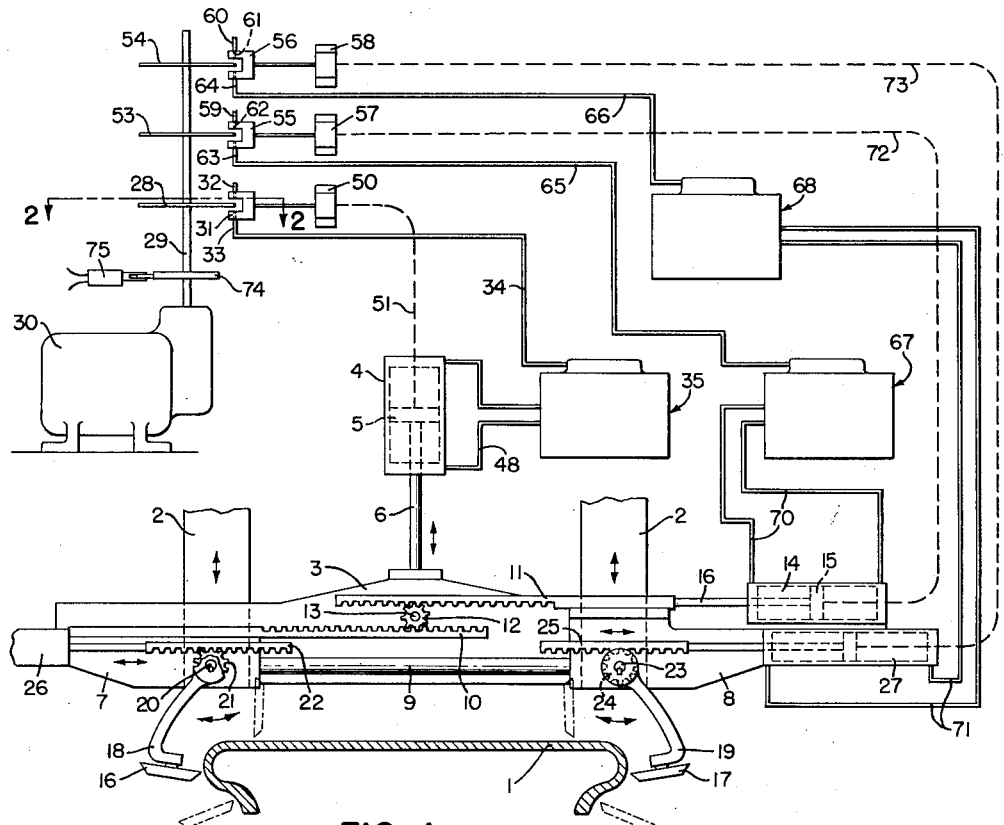
FIG. 1 is a schematic view of a tire building apparatus showing the tire stitching mechanism and the controls thereof.
FIG. 2 is a sectional view taken along the lines 2—2 of FIG. 1.
FIG. 3 is an enlarged view of the senser and fluid regulator shown in FIG. 1.

Referring now to the drawings wherein one form of the apparatus is disclosed comprising a tire building drum mounted for rotation on a suitable axle and driven by conventional means. A slide bed 2 is supported on a suitable frame and located adjacent the drum 1. A carriage 3 is mounted on the slide bed 2 for linear movement to and from the drum in a generally radial plane relative to the drum. The carriage 3 is actuated by a cylinder 4 having a piston 5 connected to the carriage 3 by the piston rod 6. A pair of platforms 7 and 8 are mounted on the carriage 3 for movement at right angles relative to the direction of movement of the carriage and substantially parallel to the axis of the drum 1. A suitable slide 9 is provided on the carriage 3 on which the platforms 7 and 8 reciprocate. Pinion rack bars 10 and 11 extend respectively from the platforms 7 and 8 and each respectively mesh with a pinion gear 12 which is rotatable about a fixed pinion 13. The rack bar 11 is actuated by a cylinder 14 and piston 15 having a piston rod 16 connected to the rack bar 11. As the rack bar 11 is moved by the piston 15 the platform 8 is linearly moved relative to the carriage 3 along the slide 9 and simultaneously the pinion gear 12 is rotated to actuate the rack bar 10 to move the platform 7 in a direction opposite to that of the carriage 8. It is thus seen that the platforms 7 and 8 move linearly in an axial direction relative to the drum 1 and simultaneously either to or from the center portion of the drum. Movement of the platforms 7 and 8 is equal in both velocity and displacement relative to the drum 1.

A stitching mechanism such as rotatable discs 16 and 17 are supported for rotation on the arms 18 and 19 which are respectively mounted for pivotable movement on the platforms 7 and 8. The arm 18 pivots about the axis of the stub axle 20 which is provided with a pinion gear 21 which meshes with a rack bar 22 mounted for reciprocating movement on the platform 7. Similarly, the arm 19 pivots about the axle 23 mounted on the carriage 8 and having a pinion gear 24 which meshes with a rack bar 25, mounted for reciprocation on the platform 8. The rack bars 22 and 25 are respectively actuated by cylinders 26 and 27.

As previously indicated the carriage 3 is moved radially relative to the drum 1 by the cylinder 4. The position and relative velocity of movement of the carriage 3 is controlled by a master controller or template 28 which is secured to a shaft 29 driven by the timing motor 30. As shown in FIG. 2 the peripheral edge of the controller 28 varies in radial dimension and passes over a senser 31 having an inlet nozzle 32 and receiving nozzle 33. A fluid medium, preferably air, is supplied to the nozzle 32 at a substantially constant pressure from a source (not shown). The senser 31 is substantially U-shaped in cross section and a continuous stream of air passes from the nozzle 32 to the nozzle 33 with the edge of the controller 28 interrupting the stream. As the controller 28 rotates through the stream the amount of air passing into the receiving nozzle 33 is varied. The nozzle 33 is connected by a flexible tube 34 to a fluid pressure relay or regulator 35, shown in detail in FIG. 3, which converts the variations in air pressure passing through tube 34 into variations in hydraulic fluid pressure within the cylinder 4. Regulator 35, of the well known "Askania" jet pipe type, includes a movable jet pipe 36 pivoted at 37 and supplied with pressure fluid, preferably oil, from a suitable source (not shown) to the inlet 38. The pressure fluid which is ejected from the orifice 39 of the jet pipe 36 is directed into reception orifices 40 and 41 depending upon the relative position of the jet pipe 36. The jet pipe 36 is controlled by a differential pressure device comprising a casing 42 separated into two chambers by a diaphragm 43 which is connected to the jet pipe nozzle by a link 44. The jet pipe 36 may be adjusted to a neutral position relative to the orifices 40 and 41 by means of an adjusting screw 45 connected to the jet pipe 36 by a spring 46.

When the motor 30 is started and the controller template 28 rotated the air pressure in the tube 34 and in the chamber 47 will be varied. Assuming that the proper effective relationship of the controller template 28 and the nozzles 33 and 32 is such that the pattern projects a distance into the air jet of approximately one half the cross sectional area thereof, as shown in FIG. 2, and the edge of the template 28 moves to cover less than one half the cross sectional area of the air jet, the air pressure in tube 34 will rise so that the pressure in the chamber 47 will also rise to slightly rotate the jet pipe 36 in a counterclockwise direction. This increases the pressure in the pipe 48 connected to the orifice 41 so that the piston 5 is moved away from the drum 1 and hence moves the carriage 3 radially away from the drum 1. If, however, the controller template moves to cover more than half the area of the receiving nozzle 33 the pressure in tube 34 decreases so that the jet pipe 36 is slightly rotated clockwise, to increase the pressure in orifice 40 and decrease the pressure in orifice 41 to move the piston 5 in an opposite direction toward the drum 1. The regulator 35, therefore, acts as a pressure relay which converts the variations in air pressure received by the nozzle 33 to variations in hydraulic fluid pressure within the cylinder 4.

The support 31 for the nozzles 32 and 33 is mounted on member 50 for reciprocal movement in a direction radially of the controller template 28 and a flexible cable 51 connects the piston 5 to the nozzle support 31 and acts as a positioned feed back so that the nozzle 33 and 32 are maintained at the proper position relative to the periphery of the controller template 28. In other words, if the periphery of the controller template 28 increases in radial dimension from a position 52a to a position 52b and is to be maintained at the position 52b, the flexible cable 51 merely moves the nozzle support 31 radially outwardly relative to the shaft 29 so that the edge 52b of the controller template is positioned so as to cover approximately one half the cross sectional area of the nozzles.

The pistons 14 and 27 are each respectively controlled by a controller template 53 and 54 also mounted upon the shaft 29 and having sensors 55 and 56 supported for reciprocal movement relative to the support members 57 and 58. Where air pressure is supplied from a suitable source (not shown) through the pipes 59 and 60 to the nozzles 61 and 62 and directed to the receiving nozzles 63 and 64. Variations in air pressure are carried by the flexible pipes 65 and 66 to the respective pressure relays or regulators 67 and 68 which control respectively the cylinders 14 and 27 through the lines 70 and 71. The position feed back cable 72 connects the piston 15 with the support 57 and the flexible feed back cable 73 connects the piston 27 with the support 58.

A "stop-start" cam 74 is secured to shaft 29 for actuating a switch 75 to deenergize the timing motor 30 at the desired time during the operative cycle of the machine.

From the foregoing description, it is seen that a universally variable control is provided for the radial and axial stitcher actuating mechanisms to provide a resultant controlled curvilinear pathway or orbit for the stitcher platforms, and that the plane of revolution of the stitching discs are progressively changed independently of the movement of the platforms. The movement of the platforms and the plane of the stitching discs may be readily changed by replacing one or more of the controller templates 28, 53 or 54 to provide a new curvilinear pathway and or stitching plane for the stitching discs to accommodate a different size or constructoin of tire on the machine.

While certain representative embodiments and details have been shown for the purpose of illustrating the invention, it will be apparent to those skilled in this art that various changes and modifications may be made therein without departing from the spirit or scope of the invention.

I claim:
1. An apparatus for stitching plies of rubberized fabric to form a tire carcass comprising a rotatable building drum having rounded shoulders, a rotatable stitching member operable upon each of said shoulders, a support for each stitching member said supports each mounted upon a traversing means for moving said stitching members in opposite directions along a linear path extending parallel to the rotational axis of the drum, a carriage for supporting said traversing means said carriage being movable along a linear path in a direction radially of the drum, fluid actuated means for moving said traversing means, fluid actuated means for moving said carriage, a pair of templates and sensors, each template movable relative to a senser for simultaneously varying the output of each senser, a pair of control means responsive to the output of its respective senser for simultaneously varying the amount of fluid supplied respectively to each of said moving means whereby said stitching members are moved simultaneously along resulting controlled curvilinear pathways at a variable velocity.

2. An apparatus as claimed in claim 1 in which the means for moving said traversing means and the means for moving said carriage each include a double acting cylinder and piston, said control means respectively supplying regulated hydraulic fluid to the cylinders.

3. An apparatus as claimed in claim 2 in which each senser is mechanically linked with its respective piston whereby the senser is continuously positioned at the neutral point of its respective template.

4. An apparatus as claimed in claim 1 in which the support and each of said stitching members is pivotably mounted on said traversing means.

5. An apparatus as claimed in claim 4 in which the support for said stitching members is provided with actuating means for moving said support about its pivot.

6. An apparatus as claimed in claim 5 in which said stitcher actuating means includes a double acting cylinder and piston and third control means for supplying hydraulic fluid to the cylinder.

7. An apparatus as claimed in claim 6 in which said control means includes a template movable relative to a senser for varying the output of the said senser and said third control means includes a regulator responsive to the output of its respective senser for actuating said support.

8. An apparatus for stitching plies of rubberized fabric to form a tire carcass comprising a rotatable tire building drum having rounded shoulders, two rotatable stitching members supported respectively to operate on each shoulder, traversing means for moving said stitching members along a path extending parallel to the rotational axis of the drum, a carriage for supporting said traversing means which is movable in a direction radially of the drum, means including a first piston and cylinder for actuating said traversing means relative to said carriage, means including a second piston and cylinder for actuating said carriage relative to the drum, a pair of opposed nozzles connected to and movable with each piston, one of each pair of nozzles receiving fluid under a constant pressure and projecting it as a stream of fluid into the other nozzle of the pair, a pair of templates mounted for rotation and positioned to interrupt said fluid stream of the respective pairs of nozzles and hydraulic means for operatively connecting said other nozzle of each pair with its respective cylinder whereby variations of fluid pressure in said other nozzle caused by the interruption of said template into the said stream controls said pistons and the associated traversing means and carriage to move said stitching means simultaneously along controlled curvilinear pathways relative to said drum at a variable velocity.

9. An apparatus as claimed in claim 8 in which said stitching members are supported by means mounted on said traversing means for pivotable movement about an axis parallel to the plane of rotation of said stitching members, means for actuating said supports for pivotable movement about said axis, said support actuating means being mounted on said traversing means, each support actuating means including a third piston and cylinder, an opposed third nozzle connected to and movable with one of said third pistons, one of said third nozzles receiving fluid under a constant pressure and projecting it as a stream of fluid into the other nozzle of the pair, a third template mounted for rotation and positioned to interrupt said fluid stream of the pair of third nozzles and hydraulic means for operably connecting said other nozzle with its respective third cylinder whereby variations of fluid pressure in said third nozzle caused by the interruptions of said third template into the said stream controls said third pistons and the associated stitcher supports for simultaneously pivoting said stitcher supports about their respective axis at a variable angular velocity.

References Cited in the file of this patent
UNITED STATES PATENTS

| | | |
|---|---|---|
| 1,729,850 | Wunsch | Oct. 1, 1929 |
| 1,762,856 | Desautels | June 10, 1930 |
| 2,319,643 | Sternad | May 18, 1943 |
| 2,373,354 | Sternad | Apr. 10, 1945 |
| 2,529,739 | Powers | Nov. 14, 1950 |
| 2,539,131 | Gundersen | Jan. 23, 1951 |
| 2,838,028 | Erbguth | June 10, 1958 |